Jan. 16, 1945. J. H. MANSFIELD 2,367,414
MACHINE TOOL
Filed Oct. 3, 1941 2 Sheets-Sheet 2
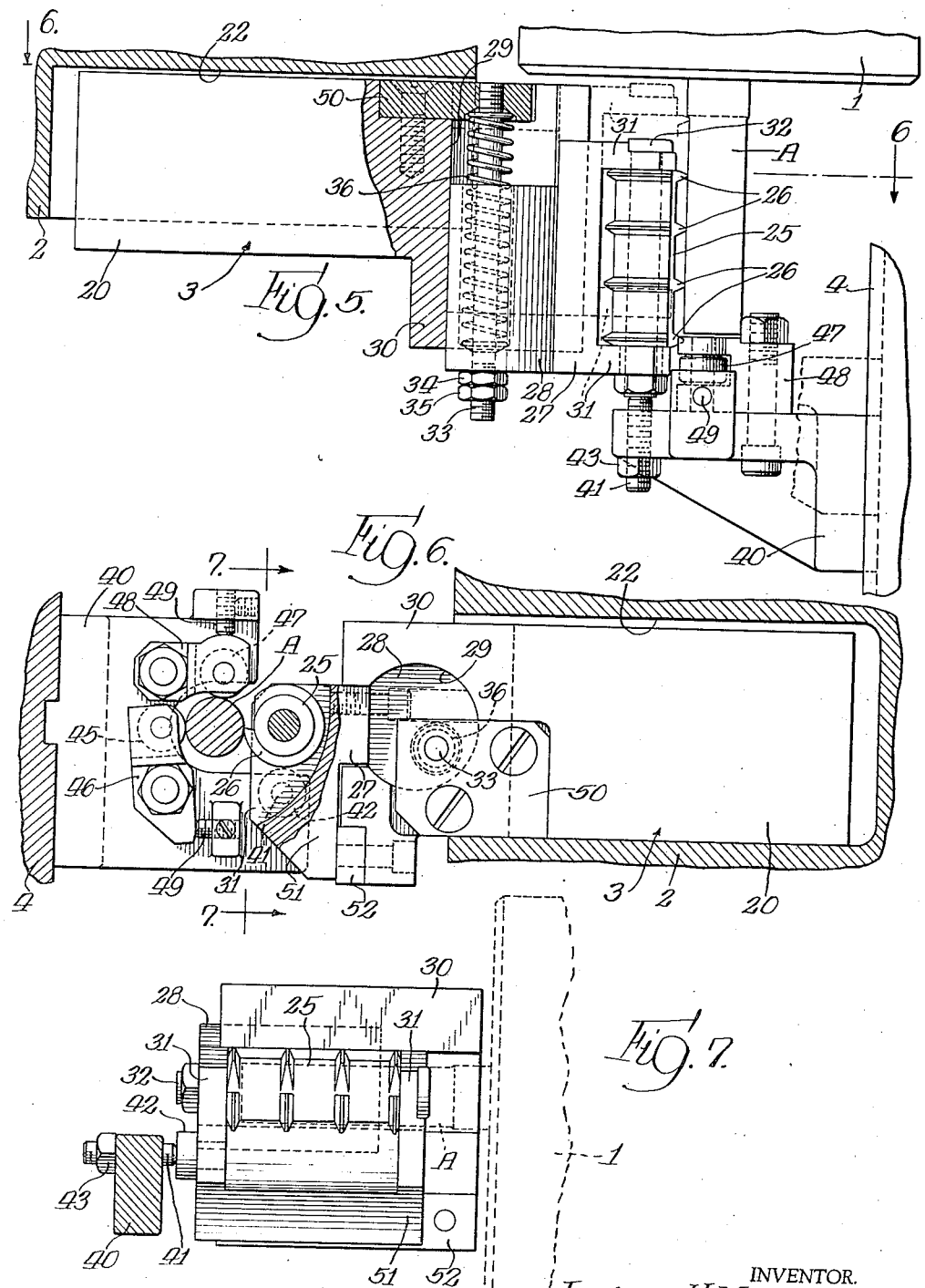
INVENTOR.
Judson H. Mansfield
BY
his Atty.

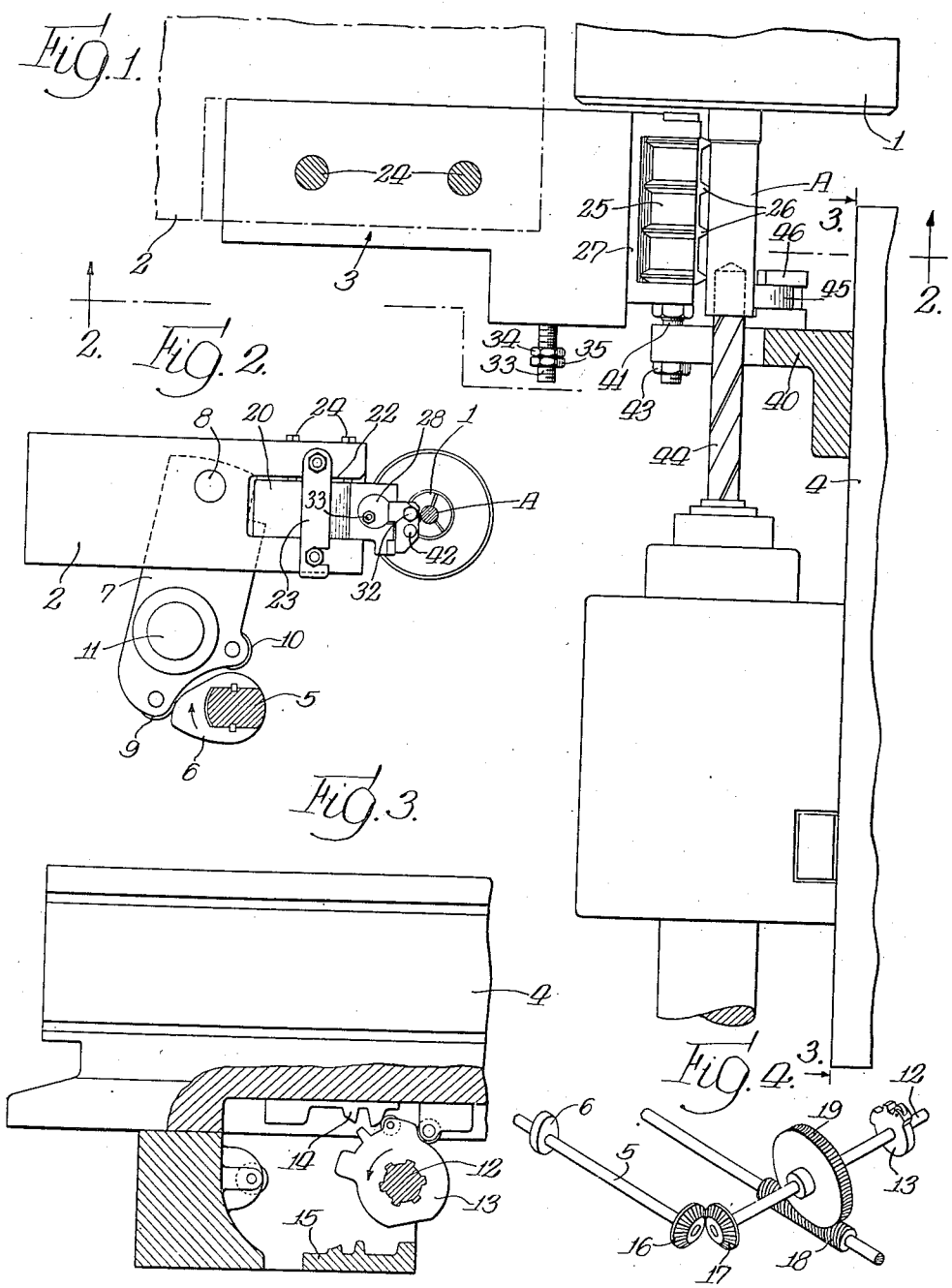

Patented Jan. 16, 1945

2,367,414

UNITED STATES PATENT OFFICE 2,367,414

MACHINE TOOL

Judson H. Mansfield, Rockford, Ill., assignor to Greenlee Bros. & Co., Rockford, Ill., a corporation of Illinois Application October 3, 1941, Serial No. 413,437

4 Claims. (Cl. 29—52)

This invention relates to a special type of tool holder adapted for use on screw machines and production lathes, and machines of like character, in which the work is revolved about an axis and the cutting tool is caused to travel in a direction parallel to that axis with its cutting point or edge engaging the work.

One object of the invention is to provide means for causing the travel of the cutting tool in a direction parallel to the axis of rotation of the work, while permitting the cross slide or carriage which supports the tool to remain stationary.

Another object of the invention is to provide a machine of the lathe type in which a cutting tool is supported on a cross slide, with provision for movement of the tool itself with respect to its support and in a direction parallel to the axis of the lathe spindle, together with a carriage having a feeding movement in that direction and having means positioned to engage the tool or its holder for causing such movement of the tool.

A further object of the invention is to provide a machine of the lathe type having a cross slide movable transversely of the axis of the lathe spindle and supporting a tool to be brought into working position by such movement, together with a carriage supporting another tool to be fed into the work in the general direction of the lathe spindle, the tool support on the cross slide being constructed to permit movement of the tool relatively to the cross slide in the direction of carriage feed and the carriage having means for so moving the said tool.

Other objects and advantages of the invention will readily appear to those skilled in the art upon consideration of the following specification taken in connection with the drawings, in which:

Fig. 1 is a fragmentary plan view of a production lathe provided with a tool and supporting and feeding means therefor embodying this invention.

Fig. 2 is a detail view taken as a vertical section substantially as indicated at line 2—2 on Fig. 1, but on a reduced scale.

Fig. 3 is a detail view taken as a vertical section substantially as indicated at line 3—3 on Fig. 1, and on the same scale as Fig. 2.

Fig. 4 is a diagrammatic perspective view of the interconnected drive means for feeding the carriage and the cross slide, but on a much smaller scale than the preceding views.

Fig. 5 is a detail view in plan and partly in section, showing the special tool holder with the tool in position ready for work, and with the driving bracket of the carriage in operative relation to the tool.

Fig. 6 is a vertical sectional view taken substantially as indicated at line 6—6 on Fig. 5.

Fig. 7 is a vertical section taken substantially at line 7—7 on Fig. 6.

While I have shown in the drawings and shall herein describe in detail a preferred form of my invention, it is to be understood that I do not intend to limit the invention to the specific form or application disclosed, but aim to cover all modifications and alternative constructions falling within the scope of the invention as expressed in the claims.

In the structure herein illustrated, only the essential elements of a machine of the lathe type are indicated, and it may be understood that the invention is applicable to a wide variety of such machines. Fig. 1 shows a work piece A supported for revolution about its axis in a suitable chuck or collet carried by the spindle 1 which may be one of several such elements in a multiple spindle machine, or which may be the only work supporting element in a single spindle lathe. A portion of the cross slide 2 is shown in broken outline in Fig. 1 supporting a tool holder 3, and it may be understood that the cross slide 2 is provided with any suitable mounting upon which it is movable toward and from the axis of the spindle and its collet. The machine bed (not shown) also supports a carriage, of which a fragment is shown at 4 in Fig. 1, and which is mounted for feeding movement or traverse longitudinally of the machine bed and parallel to the axis of the spindle. Means for moving the cross slide 2 toward and from the work is shown in Fig. 2 as comprising a rotary shaft 5 carrying a cam 6 which actuates a lever 7 connected by a pin 8 to the cross slide 2. As the shaft 5 rotates, the cam first contacts the roller 9 of the lever 7, tilting the lever in a direction to move the slide 2 inwardly—that is, toward the work A; then as the shaft 5 continues to rotate the high portion of the cam 6 engages the roller 10, which is so related to the fulcrum pivot 11 of the lever that this engagement of the cam rocks the lever in the opposite direction to withdraw the slide 2 from the work.

The carriage 4 is actuated by a rotary shaft 12 which carries a mutilated gear 13. The slide is provided with a specially formed rack 14 disposed above the shaft 12 and with a second rack 15 disposed below the shaft so that engagement of the teeth of the gear 13 with the rack 14 feeds the carriage 4 in one direction, and engagement of the teeth of the gear 13 with the rack 15 moves the carriage 4 in the opposite direction.

The shafts 5 and 12 are interconnected as by bevel gears 16 and 17, so as to actuate the cross slide 2 and the carriage 4 in timed relation to each other; and the cross slide and carriage may, therefore, be actuated from a common power source, such as the worm 18 meshing with the worm gear 19 on the shaft 12.

The shank 20 of the tool holder 3 is fitted into a suitable recess 22 in the cross slide 2 and secured therein by means of a clamp strap 23 and set screws 24. The cutting tool 25 shown in the drawings is of the circular type which is sharpened by grinding a notch in its circular contour and, in the present instance, the tool is shown with multiple cutters 26 spaced upon it at equal intervals along the axis of its cylindrical form, so that, with these cutters all working simultaneously, the necessary traverse of the tool to perform a complete cut in the length of the work piece A is reduced to substantially the distance between successive cutters 26. The tool 25 is supported in a tool slide 27 which includes a body portion 28 of generally cylindrical form fitted into a correspondingly shaped slideway 29, which is formed in the head portion 30 of the tool holder 3. The tool slide 27 includes cheeks or flanges 31 between which the tool 25 is fitted and clamped by means of a bolt 32 which extends axially through the body of the tool 25.

The slideway 29 in the head portion 30 of the tool holder 3 provides for movement of the tool slide 27 through a distance approximating the interval between successive cutters 26 of the tool 25, and a threaded stud 33 projecting from one side of the head 30 and, extending through the body portion 28 of the tool slide, carries a stop nut 34 and a lock nut 35 which are adjustable to determine the exact range of movement of the tool slide 27. A spring 36 is conveniently coiled about the stud 33 and pocketed in a suitable bore in the body 28, so as to react between said body and a fixed portion of the tool holder 30 to urge the tool slide 27 yieldingly toward the stop 34. The tool holder is shown at the limit of movement in Fig. 5 and with the cross slide 20 fed inwardly, so as to bring the multiple cutters 26 into engagement with the work piece A and ready for operating thereon when the tool 25 is fed along the work piece parallel to its axis.

The necessary feeding movement is accomplished by means of a bracket 40 which is secured to the carriage 4 and projects therefrom far enough to support a contact screw 41 in line with a cooperating plug or button 42 which projects from the face of the tool slide 27 a short distance below the bolt 32 on which the tool 25 is carried. Thus, as the carriage 4 travels toward the spindle, it engages the tool slide 27 by contact of the screw 41 with the button 42 and carries the slide along in the direction of the axis of the work piece A at a suitable rate of feed for causing the cutters 26 to perform their work in reducing the diameter of the part A. The screw 41 is adjustable in the bracket 40 and is provided with a nut 43 for locking it at any position of adjustment to insure completion of the feeding stroke with respect to the cutters 26 simultaneously with the completion of the movement of the carriage 4 in that direction.

As shown in Fig. 1, the carriage 4 supports, in addition to the bracket 40, a tool 44 which is shown as a twist drill and which is adjusted to perform a drilling or boring operation in the end of the work piece A simultaneously with the cutting operation performed by the cutters 26. And since, in the particular example illustrated, the work piece A is of considerable length and is supported only at one end in the collet or chuck of the spindle 1, it is desirable to provide some support for the outer end of the work A to prevent it from being sprung out of alignment by the cutting effort of the turning tool. Therefore, the bracket 40 is shown in Fig. 6 as equipped with a rest roller 45 adjustably carried on the lever 46 and engaging the work piece A at the side opposite that which is attacked by the cutters 26. A second rest roller 47 is shown supported on the bracket 40 by a lever 48 and bearing against the upper side of the work piece A. The levers 46 and 48 are provided with adjusting screws 49 to permit setting the rollers 45 and 47 accurately in position to engage and support the work piece A. Accordingly, the travel of the carriage 4 brings the rest rollers 45 and 47 into position to support the work piece A during the cutting operation.

It will be evident that the feeding stroke or advance movement of the carriage 4 and its bracket 40 will move the tool slide 27 in opposition to the spring 36 and will compress the spring so that, upon reversal of the movement of the carriage 4, the spring 36 will react to return the slide 27 to the opposite limit of its range as determined by the stop nut 34. As indicated in Fig. 3, the mutilated gear 13 which drives the carriage 4 may be so designed as to permit the carriage to stand still for a predetermined interval before commencing its return movement, and, if desired, the timing of the shaft 5 in relation to the shaft 12 may be such as to cause withdrawal of the cross slide 2 during this interval and before the tool slide 27 is permitted to commence its return movement. To allow for this, the face of the button 42 may be made large enough to maintain contact with the end of the screw 41 through a considerable range of transverse movement of the cross slide 2.

For convenience of manufacture, the guide bore 29 in the head portion of the tool holder 21 extends clear through the head and a backing plate 50 is applied at one end of the bore to support the threaded stud 33 and to back up the spring 36. The plate 50 overlaps only a portion of the bore 29, thus avoiding the possibility of an air pocket or accumulation of oil which might impair the free movement of the tool slide. The tool supporting head of the slide 27 includes a depending portion 51 which rides against a hardened wear plate 52 set in the adjacent face of the head 30. This bearing surface, in conjunction with the accurately machined bore 29 and the accurately fitted cylindrical body 28 therein, insures firm and sturdy support for the tool in its operation.

I claim as my invention:

1. In a lathe or like machine which includes means to hold a work piece and revolve it about an axis, together with a cross slide movable toward and from said axis and a carriage movable parallel to said axis, a tool holder secured to the cross slide with a tool slide in said holder movable in the same direction as said carriage, a rest bracket on the carriage including a roller positioned to support the work and a part positioned to engage and drive the tool slide whereby the travel of the carriage provides the cutting feed of a tool carried by the tool slide.

2. A tool holder which includes a shank portion to be secured in a tool carriage, a head portion formed with a cylindrical bore extending transversely of the shank and a slot opening through one side of said bore, and a tool slide having a cylindrical body slidable in said bore with a part extending through said slot and supporting spaced flanges with means for clamping a cutter between said flanges, said body having a cylindrical bore together with a spring in said bore of the head extending into the bore in the body and reacting against the end wall of said bore in said body to urge the slide yieldingly in one direction and a stud anchored in the body extending axially through said spring and projecting through the end wall of said bore in the body with a stop nut on said projecting part of the stud limiting movement of the slide in response to said spring.

3. A tool holder which includes a head portion formed with a cylindrical bore with a clearance slot opening through one side of said bore, and a tool slide having a cylindrical body slidably fitted in said bore with a part extending through said slot, said part having means for supporting a cutter and having a depending portion outside the slot, with a flat bearing surface extending in a plane parallel to the axis of said cylindrical bore and slidably engaging a cooperating flat bearing face on the head.

4. A tool holder which includes a head portion formed with a guideway having a slot opening through one side of said guideway, and a tool slide having a body fitted slidably in said guideway with a part extending through said slot and provided with tool supporting means, together with a spring disposed in said guideway, stop means extending across one end of the guideway and engaging one end of said spring, the other end of the spring reacting against said tool slide to urge it in one direction, and a stud anchored in said stop means and extending axially through the spring and through said slide, said stud being threaded and provided with an adjustable stop nut for engaging the outer end of the slide to limit the extent of spring-effected movement thereof.

JUDSON H. MANSFIELD.